3,324,887
DIRECTIONAL FLOW CONTROL VALVES
John H. Mueller, Olmsted Township, Ohio, assignor to Republic Manufacturing Company
Filed Dec. 2, 1964, Ser. No. 415,231
17 Claims. (Cl. 137—625.63)

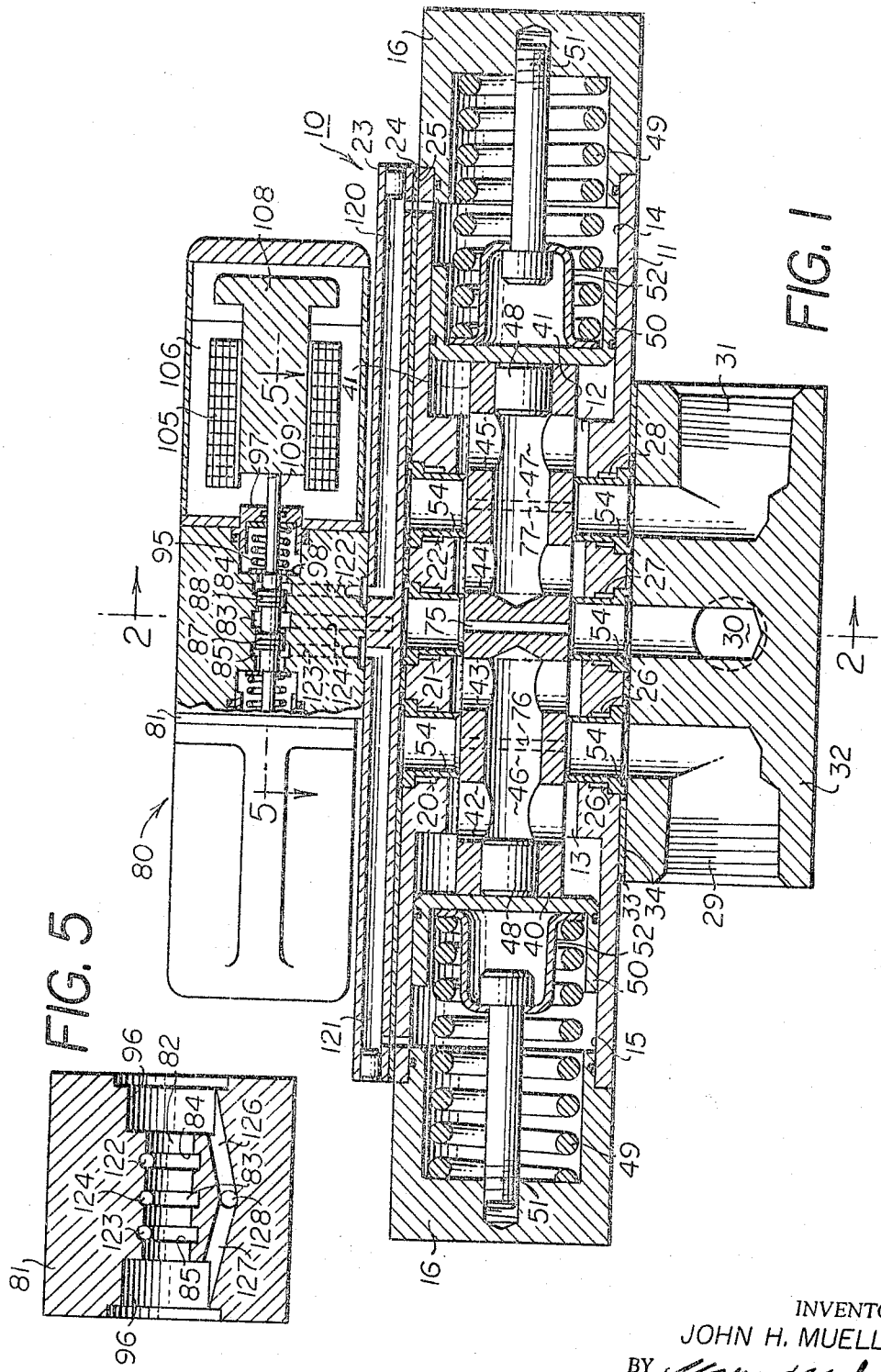

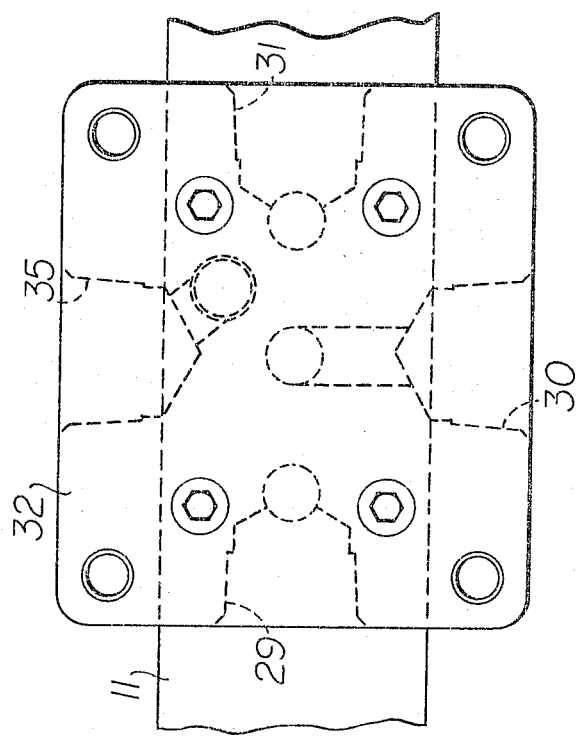
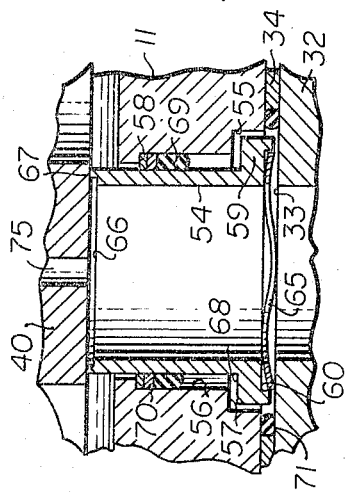
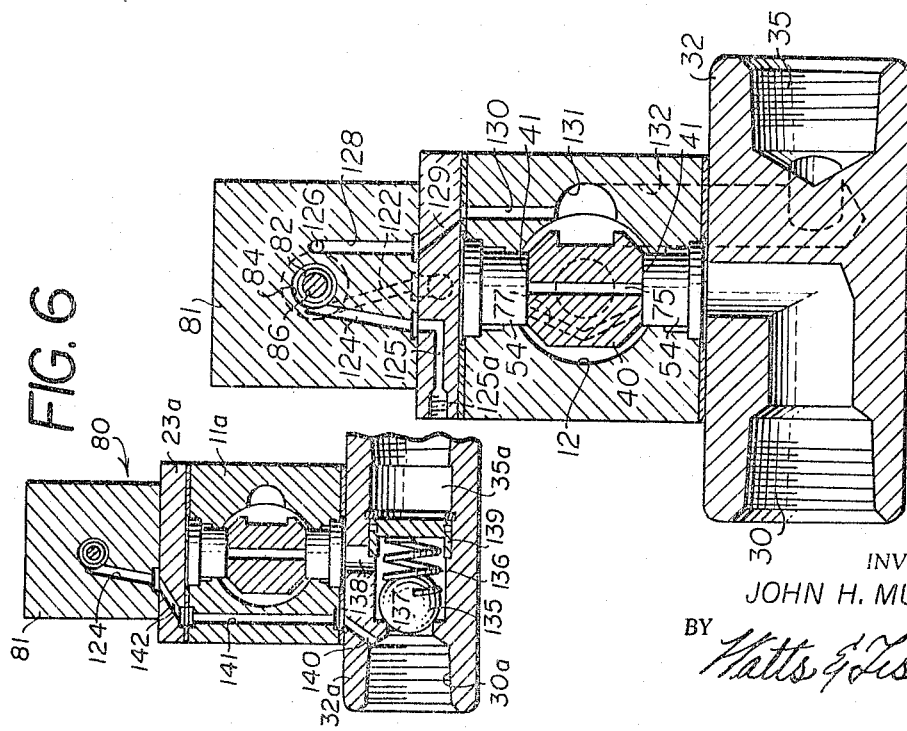
FIG. 3
FIG. 4
FIG. 2
FIG. 6
INVENTOR.
JOHN H. MUELLER
BY Watts & Fisher United States Patent Office 3,324,887
Patented June 13, 1967

This invention relates generally to fluid valves, and more specifically to valves for directional control of fluids under pressure.

A primary problem in the construction of conventional directional flow control valves has been to prevent leakage, this being particularly true at high operating pressures. Most of the commercially available valves including both slide valves and spool valves, are subject to severe leakage, since they embody no particular sealing feature other than two lapped or honed surfaces. Clearance is provided for the operating member and this clearance form a leakage path.

Another problem particularly associated with conventional slide valves has been that a large force was required to operate the slide with the fast response which is desired of a directional control valve. Due to their excessive energy requirements, the conventional slide valves have not been adapted to normal pilot operation. Such valves also have not been adapted to be directly operated electrically. For example, if the slide of the valve is spring centered, any solenoid used to actuate the slide must be capable of exerting the required high operational force plus the force necessary to overcome the centering springs. Solenoids capable of exerting the necessary force and providing the desired fast response are often too large and too expensive to be incorporated into a valve.

It has been proposed to construct a slide valve using a pair of aligned seals which bear against opposite surfaces of the slide and are acted upon by the inlet pressure. In this conventional construction, the slide is provided with longitudinal extensions which are restrained in the valve body to guide the slide for reciprocation. The slide is theoretically pressure balanced due to the fact that the inlet pressure is effective on both seals. However, this construction presupposes that the seals can be accurately formed so as to exert equal and opposed forces on the slide. As a practical matter, such accurate formation of the seals is difficult, if not impossible, to achieve and maintain during use of the valve. As a result, a condition of pressure unbalance is usually obtained due to the fact that one of the seals is urged against the slide more tightly than the other. This condition of pressure unbalance causes the slide to move laterally and forces its longitudinal extensions against the restraining portions of the valve body. The operational force required to overcome the lateral bearing load and move the slide longitudinally is thus greatly increased. The described construction also requires that the slide be accurately mounted in the valve body in order that its opposite surfaces are parallel to the engaging end surfaces of the seals.

The present invention provides a new and improved valve construction for directional control of fluids which effectively overcomes the problem of leakage and which is characterized by a low operating force required to move the valving member. More particularly, the invention contemplates a new and improved slide valve construction which is capable of handling fluids at a pressure up to 6000 p.s.i. or higher and of being solenoid pilot operated with a relatively low pilot pressure.

As will be more fully described, the new valve is characterized by a valving member which is free to float in the valve body. The valve embodies pressure seals which act on opposite sides of the floating valving member and utilize static fluid pressures to achieve properly balanced sealing engagement with that member. In the preferred embodiment, the valving member is a slide which has a clearance with respect to the walls of the slide chamber and is free to float in a direction transverse to its longitudinal axis. The valve seals are in the form of reciprocal sleeves which are constructed and arranged to obtain a pressure balanced condition of the slide. The floating assembly of the slide and sealing sleeves in such that the sleeves maintain the slide with its longitudinal axis parallel to the longitudinal axis of the slide chamber. As a result, the slide can be easily actuated with a low operational force.

The energy requirements for operation of the new slide valve are relatively low at all operating pressures. This characteristic results in fast response with a minimum amount of work. Due to its low energy requirements, the slide valve is adapted to be pilot controlled and such an arrangement comprises another aspect of the invention.

Another feature and advantage of the invention resides in a slide valve embodying a pressure balanced slide and a depending sealing arrangement which can be economically manufactured and maintained.

Still other features and advantages of the invention will become apparent from the following detailed description when taken in conjunction with the accompanying drawings.

In the drawings:

FIGURE 1 is a vertical cross-sectional view of the preferred electrically operated, pilot controlled slide valve construction of this invention;

FIGURE 2 is a cross-sectional view taken on the line 2—2 of FIG. 1;

FIGURE 3 is a fragmentary, bottom plan view of the construction shown in FIG. 1;

FIGURE 4 is an enlarged, fragmentary cross-sectional view of a portion of the slide valve;

FIGURE 5 is a cross-sectional view taken on the line 5—5 of FIG. 1; and

FIGURE 6 is a cross-sectional view of a modified form of the invention.

Referring now to the drawings, reference numeral 10 generally designates a main valve body. The valve body 10 includes a casing 11 which is formed with a longitudinal bore 12. The center portion of the bore 12 defines a slide chamber 13 and the end portions of the bore are enlarged to form cylinder areas 14 and 15. The ends of the bore 13 are closed by blocks 16 which are mounted in fluid-tight engagement with the casing 11.

A plurality of longitudinally spaced holes 20, 21 and 22 are formed through the upper side wall of the valve body casing 11, as viewed in FIG. 1, into the chamber 13. A plate 23 which has a flat face 24 is secured to the valve body casing 11 over the outer ends of the holes 20—22 and a sealing gasket 25 is provided between the casing and the flat face 24. A corresponding number of holes 26, 27 and 28 are formed through the lower side wall portion of the casing 11 and are aligned with the upper holes 20–22.

In the illustrated embodiment of the invention, the holes 26–28 define fluid passages which respectively communicate with ports 29, 30 and 31 in a porting block or manifold 32. The porting block or manifold 32 has a flat face 33 and is secured in fluid-tight engagement with the casing 11 by means including an intermediate sealing gasket 34. The two cylinder ports 29 and 31 are normally connected to a fluid motor or other controlled device, while the port 30 is normally connected to the delivery side of a pump or other suitable source of fluid under pressure. The function of the valve is to connect either of the cylinder ports 29 and 31 with the pressure port 30 and the other port to an exhaust passage 35 which is also formed in the block 32 and is adapted to be connected to a fluid reservoir.

The valving action is accomplished by a valve slide 40 which is reciprocal in the chamber 13. The valve slide 40 has opposite parallel surfaces 41 which are ground and lapped flat. In accordance with this invention, the slide is provided with a radial clearance and is free to float with the surfaces 41 moving toward and away from the wall portions of the chamber 13. A plurality of fluid ports 42, 43, 44 and 45 are formed transversely through the slide and open on the surfaces 41. The slide ports 42 and 43 are connected by a longitudinal center passage 46 in the slide, and the ports 44 and 45 are similarly connected by a center passage 47. The outer ends of the passages 46 and 47 are closed by plugs 48.

As shown, the slide 40 is centered to a neutral or closed position of the valve by springs 49 and pistons 50. The pistons 50 are slidable in the cylinder areas 14 and 15 and are urged by the springs 49 into engagement with the ends of the slide. The springs 49 are contained between cups 52 and the bore sealing blocks 16 by bolts 51. The heads of the bolts 51 are slidable in the cups 52 and the ends of the bolts are threaded into the blocks 16. This arrangement provides for predetermined loading of the springs 49 by adjustment of the bolts 51 and permits the slide 40 to be located precisely in an adjustable center position.

Within each of the holes 20–22 and 26–28, there is mounted a reciprocal plunger seal in the form of a tubular sleeve 54. These sleeves project into the valve body chamber 13 with their inner ends in pressure engagement with the flat sides 41 of the slide 40. As hereinafter described in greater detail, the slide ports 42–45 are alignable with the sleeves 54 which establish fluid flow paths between the slide ports and the ports 29–31 in the porting block 32. At the same time, the sleeves are formed to prevent cocking of the slide 40 during operation of the slide, whereby the slide is maintained with its longitudinal axis parallel to the longitudinal axis of the valve casing chamber.

Since the holes 20–22 and 26–28 are all substantially identical in their formation, and since the sleeves 54 are mounted in the holes in the same manner, only one of the holes and cooperating sleeves will be described in detail with reference to the enlarged view of FIG. 4. As there shown, the hole for the sleeve is machined with a counterbore 55 in its outer end and with an intermediate bore portion 56 which has a larger diameter than the sleeve 54. The bottom of the counterbore 55 defines an annular shoulder 57 and the inner end of the bore portion 56 terminates at a second shoulder 58. The outer end of the sleeve 54 is provided with a head 59 which is received in the counterbore 55 so that the head can move in the manner of the piston between the surface 33 of the porting block 32 and the shoulder 57.

A suitable backing member in the form of a wave spring 65 exerts a longitudinal inward thrust on the sleeve 54 to maintain its inner end in constant pressure engagement with the slide 40. In the preferred construction, the head 59 of the sleeve is formed with a recess 60 in which the spring 65 is disposed. With this arrangement, the sleeve heads 59 can seat against the surface 24 of the plate 23 and the porting block surface 33 without flattening and overloading the wave springs.

When fluid is being transported through the valve, the sleeves 54 are forced tight against the slide 40 by the combined action of the variable fluid pressure exerted on the sleeves 54 and by the force of the wave springs 65. In order to minimize the operational forces required to move the slide 40, it is preferred to form the inner end of each of the sleeves with an inner annular groove 66 which defines a slide-engaging face 67 of reduced cross-sectional area relative to the cross-sectional wall area of the sleeve. The inner annular groove 66 permits fluid from the bore of the sleeve 54 to exert a hydraulic thrust on the inner end of the sleeve which partially balances the oppositely fluid pressure on the head 59. The fluid pressure on the outer end of the head 59 is also partially balanced by the fluid within the counterbore 55 which acts on the external annular shoulder 68 formed by the head 59. This construction of the sleeves 54 therefore obtains a differential piston area effect wherein each sleeve will exert a force on the slide 40 which is equal to the fluid pressure times the area of the slide engaging face 67. This effect reduces the tendency of the sleeves to lock against the slide 40 due to excessive hydraulic thrusts on the sleeves 54, whereby the slide can be actuated by small endwise forces in relation to high fluid pressures within the valve. In addition, the effect of friction between the slide and the sleeves is minimized by the reduced areas of engagement provided by the slide-engaging faces 67.

In order to prevent fluid leakage externally of the sleeve 54, an O-ring 69 is mounted around the sleeve within the enlarged portion 56 of the hole. The O-ring 69 is restrained by a backing ring 70 which is positioned against the shoulder 58 to prevent extrusion of the O-ring. When assembled in the manner illustrated in FIG. 4, the fluid which enters the enlarged portion 56 of the hole exerts a pressure on the O-ring 69 to maintain a fluid-tight seal around the sleeve. An O-ring 71 is also fitted in a hole of the gasket 34 around the sleeve head 59 and is in fluid sealing engagement between the casing 11 and the porting block 32.

Referring again to FIG. 1, it will be seen that the sleeves 54 mounted in the holes 20–22 are respectively aligned with the sleeves mounted in the holes 26–28 on the opposite side of the slide 40. When the slide is moved in either direction from the illustrated neutral or center position, the inlet pressure from the porting block passage 30 is communicated through either of the slide ports 43 or 44 and the bores of the sleeves mounted in the aligned holes 21 and 27. Similarly, the sleeves mounted in the holes 20 and 26 will be disposed in mutual fluid communication with the cylinder passage 29 through either of the slide ports 42 or 43, and the sleeves mounted in the holes 22 and 28 will communicate with the cylinder passage 31 through either of the ports 44 or 45. The described arrangement is therefore such that the forces exerted on one side of the slide due to the differential fluid pressure loading on the sleeves and the constant wave spring pressure will be equal to the forces exerted on the opposite side of the slide by the sleeves. Thus, the slide 40 is pressure balanced within the chamber 13 when the valve is open.

In the neutral or closed position of the valve shown in FIG. 1, the inlet pressure from the port 30 is effective in the two center sleeves on opposite sides of the slide through a transverse passage 75 which is formed between the ports 43 and 44. Accordingly, the pressure balanced condition of the slide is maintained when the valve is closed. In high pressure applications, it has been found desirable to provide additional balance holes 76 and 77 in the slide 40. The balance hole 76 provides communication between the sleeves mounted in the holes 20 and 26, and the balance hole 77 provides communication between the sleeves mounted in the holes 22 and 28.

It will be understood that it is desirable to maintain the pressure balance condition of the slide 40 in order to minimize the forces necessary to operate the valve. When the sleeves 54 are correctly formed and mounted in their respective holes in the manner described, the pressure balanced condition is obtained due to the fact that each pair of the aligned valve sleeves 54 on opposite sides of the slide are in mutual fluid communication and are therefore subject to the same differential fluid pressure loading. It is difficult, however, to machine the valve sleeves in order to provide for an absolute pressure balanced seal. For example, the sleeve mounted in the hole 20 may be improperly formed so that the differential piston area arrangement by which the fluid pressure in the valve tends to urge this sleeve against the slide is greater than the resultant pressure loading on the aligned sleeve in the hole 26. If this condition occurs and no provision is made to overcome it, the higher pressure loading on the upper sleeve will force it downwardly in the valve body in a manner which would tend to cock the valve slide so that its longitudinal axis is no longer parallel to the axis of the casing chamber 13. As a result, the operational forces required to move the slide 40 would be greatly increased, and the slide might even be completely locked between the seals. Further, cocking of the valve slide in the manner described might break the pressure seals formed by the remaining valve sleeves so that leakage will occur though the valve body.

This invention is characterized in that the valve slide 40 is free of longitudinal supporting structure at its ends, as has been conventional in the art, whereby the slide is free to float within the size limitations of the valve casing 11 and yet remain parallel to its axis. In order to provide for this parallel floating movement of the valve slide, all of the sleeves 54 on each side of the valve are lapped to a uniform length, such as by simultaneously machining their end faces on a lapping machine. In the condition assumed above wherein the fluid pressure loading on the sleeve mounted in the hole 20 is greater than the pressure loading on the sleeve mounted in the hole 26, the upper sleeve will be forced downwardly in the valve body and will therefore press the slide toward the porting block 32. The slide will move downwardly until the pressure on the two aligned valve sleeves is equalized or until the head of the lower sleeve contacts the flat surface 33 of the porting block. Inasmuch as all of the valve sleeves 54 along the lower side of the valve slide are of uniform length, as are the sleeves on the upper side of the slide, the lower sleeves will all move in unison toward the porting block so that the slide will not cock endwise to prevent free longitudinal movement thereof. At the same time, the valve sleeves along the upper side of the slide will move inwardly of the valve body to maintain fluid pressure engagement with the slide, and the condition of pressure balance between the aligned sleeves on opposite sides of the slide will be retained due to their mutual fluid communication. In an extreme condition in which the valve sleeves on one side of the slide are seated against the surfaces of either the plate 23 or the porting block 32, the slide will remain parallel, since these surfaces are machined flat and since the sleeves are of uniform length.

As generally described above, one important feature of this invention resides in the low energy requirements to operate the valve at all operating pressures. This advantageous characteristic results from the floating slide arrangement and the low sealing forces exerted by the sleeves 54 on the slide 40. The low energy requirement is important in a directional control valve, since it results in fast response with minimum work.

It will be apparent to those working in the art that the new slide valve provided by this invention can be operated in any suitable manner, such as by a manually operated pivot lever attached to an end of the slide. However, due to the characteristic low energy requirements of the new valve construction, the valve is particularly adapted to be pilot controlled. A suitable double solenoid controlled, spring-centered pilot valve is generally designated by reference numeral 80.

Referring to FIGS. 1 and 2, the pilot valve 80 is shown to comprise a housing 81. The housing 81 is suitably secured to the plate 23 and is formed with a longitudinal bore 82 which is undercut or cored to define a plurality of annular, longitudinally spaced chambers 83, 84 and 85. An operating member in the form of a valve spool 86 is longitudinally slidable within the housing 81 and is formed with spool heads 87 and 88 which have a fluid-tight sliding fit in the bore 82 and are adapted to intercommunicate the inlet and outlet passages of the pilot valve in a manner to be described.

The spool 86 is centered in a closed position by springs 95 which are mounted in counterbores 96 formed in the ends of the bore 82 (FIG. 5). The springs 95 are engaged between plugs 97 which seal the ends of the counterbores 96 and washers 98 which bear against shouldered portions of the spool. Operation of the three position, spring-centered pilot valve 80 is obtained by solenoids (only one of which is shown) mounted at each end of the casing 81. Each solenoid includes a solenoid coil 105 which is placed on a frame 106 and a plunger 108. The plungers 108 engage reduced diameter end portions 109 of the spool 86 which project through the plugs 97.

The external fluid connections to the pilot valve 80 are shown as including cylinder chamber connecting passages 120 and 121 which are formed through the plate 23 and respectively communicate with the cylinder areas 14 and 15 in the valve body casing 11. The cylinder connecting passage 120 is communicated by a drilled passage 122 in the pilot housing 81 with the spool chamber 84. The cylinder connecting passage 121 is similarly connected to the spool chamber 85 by a drilled passage 123. In the embodiment of FIGS. 1, 2 and 3, the pressure connection to the center spool chamber 83 is provided by a passage 124 which connects to a passage 125 in the plate 23. The passage 125 has an external port 125a which is used to provide an external source of pilot pressure required to operate the slide 40. As shown most clearly in FIG. 5, exhaust connections are provided by internal passages 126 and 127 which extend from the counterbores 96 to a main exhaust passage 128. This exhaust passage is communicated through a hole 129 in the plate 23 to a passage 130 in the valve body casing 11. The valve body passage 130 extends to a longitudinal bore 131 which is formed in one side of the valve casing bore 12 and which is in turn communicated through a passage 132 to the exhaust port 35 of the porting block 32.

It will be seen that movement of the spool 86 to the left, as viewed in FIG. 1, places the spool chambers 83 and 85 in communication, thus admitting pressurized fluid through the inlet passage 124 to the passage 123 and the connecting cylinder passage 121 in the plate 23. At the same time, the cylinder area 14 in the valve casing 11 is opened to exhaust through the cylinder connecting passage 120, the pilot housing passage 122, the chamber 84 and the communicating exhaust passages 126 and 128. Conversely, movement of the spool 86 to the right, as viewed in FIG. 1, reverses the above-described connections and admits pressurized fluid to the right-hand cylinder connecting passage 120, while permitting the return of fluid from the valve casing cylinder area 15.

A modified valve arrangement is illustrated in FIG. 6. In this modified form, a ball check 135 is provided in the inlet passage 30a of the porting block 32a. The ball check 135 is urged by a spring 136 against a seat 137 which is formed in the inlet passage upstream from a pressure inlet hole 138 which connects to the bore of the valve body casing 11a. A pressure seal 139 is mounted in the porting block 32a to seal the inlet port from the exhaust port 35a. The ball check 135 serves to obtain the minimum pilot pressure required to operate the slide 40. To this end, a pilot sensing port 140 is drilled in the porting block 32a upstream from the ball check and is communicated to a passage 141 formed through the valve casing 11a. The passage 141 is in turn communicated with the pressure passage 124 of the pilot valve housing through a hole 142 drilled in the plate 23a. Thus, the sensing port 140 and the passages 141 and 142 communicate a predetermined inlet pressure to the pilot valve 80. The operation of this modified form of the pilot actuated valve construction will be understood to be the same as that described above in conjunction with FIGS. 1, 2 and 3.

It will be understood that operation of the slide valve can be accomplished by other means than the specifically illustrated pilot valve construction. By way of example, the construction of the pilot valve may be a substantial duplicate of the main slide valve construction, whereby the pilot operating member is also a pressure balanced slide instead of a spool. In another arrangement, the valve can be directly operated electrically, while obtaining the same fast response.

The operation of the main valve slide 40 will be largely apparent from the foregoing description. In summary, FIG. 1 illustrates the neutral or center position of the slide wherein the porting block passages 29 and 31 are closed. When the valve slide is moved to the right, as viewed in FIG. 1, by admitting pressurized fluid to the cylinder area 15 to actuate the piston 50, the inlet port 30 of the porting block is connected to the cylinder passage 29 through the slide ports 42 and 43 and the connecting passage 46. Such movement of the slide also connects the porting block cylinder port 31 to exhaust through the slide port 44, the passage 47, and the port 45. The fluid passing through the valve slide from the porting block port 31 is exhausted into the bore 12 of the casing and the passage 131 which is communicated to the outlet port 35 through the passage 132. Conversely, actuation of the valve slide 40 to the left, as viewed in FIG. 1, by admitting pressurized fluid to the cylinder area 14 to actuate the piston 50 therein, places the inlet port 30 in communication with the cylinder port 31 through the valve slide ports 44 and 45 and the connecting passage 47. In this position of the slide, the cylinder port 29 is connected to exhaust through the valve slide ports 42 and 43 and the communicating passage 46.

The valve operation just described is rapid and is accomplished with a minimum amount of pressure applied to the valve slide. As previously discussed, the slide 40 is able to float within the valve body casing and, at the same time, the slide is pressure balanced in such a manner that its longitudinal axis is maintained parallel to the longitudinal axis of the valve casing bore. As a result, the slide is actuatable by a relatively small pilot pressure in a short length of time at operating pressures up to 6000 p.s.i. or higher. The slide can be moved between its closed and open position in a few tenths of a second, thereby providing for extreme accuracy in the control of the connected fluid motor.

Another feature of the invention is that the new slide valve can be relatively inexpensively manufactured and assembled and yet is capable of handling high pressures without leakage. The sealing arrangement provided by the sleeves and the slide 40 are essentially organizd in a floating system. As noted, the valve slide is free to float to the limitations of the valve body with the axis of the slide remaining parallel to the axis of the valve body chamber, while the sealing sleeves 54 are retained tightly against the opposite sides of the slide by the fluid pressure acting on the differential piston areas provided by the construction of the sleeves 54. The sleeves along each side of the slide reciprocate in unison and thereby compensate for any inaccuracies in the formation of the individual sleeves which would tend to create a condition of pressure unbalance on the slide. The mating surfaces of the sleeves and the sides of the slide are machined flat and parallel, as are the outer ends of the sleeves and the surfaces 24 and 33 of the plate 23 and the porting block 32, respectively. However, the remaining surfaces and parts of the valve assembly, including the valve casing bore 12, need not be finished with precision in order to prevent leakage paths.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. In a valve construction, the combination comprising:
   (a) means forming a valve body including spaced cylinders, an intermediate slide chamber, holes opening into said chamber through opposite wall portions thereof, and a plurality of ports communicating with at least some of said holes,
   (b) a valve slide reciprocal in said chamber, said slide having opposite parallel surfaces and fluid ports opening on said surfaces, said slide having a clearance between said surfaces and the walls of said chamber and being free to float in a direction transverse to its longitudinal axis with said opposite surfaces moving toward and away from said opposite wall portions of said chamber,
   (c) reciprocal sleeves mounted in said holes and projecting into said chamber against each of said opposite surfaces of said slide, said sleeves having ends in said holes exposed to fluid to urge said sleeves into engagement with said slide and maintain its longitudinal axis parallel to an axis of said chamber with said opposite surfaces of said slide normally out of sliding contact with said opposite wall portions of said chamber, and,
   (d) pistons mounted in said cylinders for causing reciprocation of said slide to align said slide ports with said sleeves and selectively establish fluid flow between said valve body ports through said slide, said slide being free to move relative to said pistons in a direction transverse to the direction of reciprocal movement,
   (e) a pilot valve connected to said valve body,
   (f) said pilot valve including:
      (i) a housing having a fluid inlet and a pair of fluid outlets,
      (ii) an operating member movable in said housing selectively to connect said fluid inlet to said fluid outlets,
   (g) and said valve including fluid passage means between each of said fluid outlets and a different one of said cylinders.

2. The valve construction as claimed in claim 1 wherein said sleeves are arranged in pairs with the sleeves of each pair being disposed on opposite sides of said slide, and wherein said end portions of the sleeves of each pair are in fluid communication.

3. The valve construction as claimed in claim 2 wherein said slide has a centered position in said chamber to block fluid flow between said passages, and including centering springs mounted in said cylinders and acting on said pistons to center said slide.

4. In a valve construction, the combination comprising:
   (a) structure forming a valve body;
   (b) said valve body having:
      (i) walls forming a chamber,
      (ii) first and second ports communicating with said chamber, and
      (iii) first and second holes opening into said chamber through opposite wall portions thereof,
      (iv) said first hole being in fluid communication with said first port and said second hole being blind;
   (c) an operating member movable in said chamber between one position establishing fluid flow between said ports and another position blocking fluid flow between said ports;
   (d) said operating member having opposite flat and parallel surfaces and a clearance between said surfaces and said opposite wall portions of said chamber, said operating member being free to float in said chamber with said opposite surfaces moving toward and away from said opposite wall portions of said chamber;
   (e) a plunger seal in the form of a tubular sleeve reciprocally mounted in each of said holes;
   (f) said sleeves having inner ends projecting into said chamber in pressure engagement with said flat surfaces of said operating member and opposite ends which are reciprocal in said holes in the manner of pistons, said operating member being normally held out of moving contact with said opposite wall portions of said chamber by said sleeves; and (g) said operating member having porting which establishes mutual communication between said first valve body port and the bores of both of said tubular sleeves in both of said operating member positions so that the force exerted on one side of said operating member by fluid pressure acting on the opposite end of one sleeve is equal to the force exerted on the opposite side of said operating member by fluid pressure on the opposite end of the other sleeve, whereby said operating member is maintained in a pressure balanced condition within said valve body chamber.

5. In a valve construction, the combination comprising:
(a) structure forming a valve body member,
(b) said valve body member having walls defining a slide chamber, first and second ports, and fluid passages communicating with said ports,
(c) a slide member reciprocal in said chamber for controlling the flow of fluid through said passages and communicating ports,
(d) said slide member having sides normally spaced from said chamber walls and being free to float in said chamber transverse to the direction of reciprocal movement so that said sides move toward and away from said chamber walls,
(e) at least one of said members having flat parallel surfaces at said sides of said slide member, and
(f) a plurality of valve seals which are reciprocally mounted in the other of said members and are urged toward said one member,
(g) said seals having end portions which project into said chamber and which are in sliding engagement with said flat parallel surfaces to guide said slide for reciprocal movement with said opposite sides out of contact with said chamber walls.

6. The valve as claimed in claim 5 including pilot valve means for causing reciprocation of said slide member, said pilot valve means including a housing having a pressure inlet and a pair of pressure outlets, movable operating means in said housing, solenoid means connected to said operating means, said operating means being operable by said solenoid means selectively to connect said pressure inlet to said pressure outlets, and means for applying fluid pressure from each of said outlets to a different end of said slide.

7. A valve as claimed in claim 5 wherein said seals are mounted in said valve body member.

8. A valve as claimed in claim 5 including a plurality of said seals in engagement with each of said flat parallel surfaces, and wherein the seals which engage each flat parallel surface are of equal length and can move in unison so as to maintain sealing engagement with said flat parallel surfaces and prevent longitudinal cocking of said slide member in said chamber.

9. A valve as claimed in claim 8 wherein said seals are in the form of tubular sleeves carried by said valve body member, and wherein said slide member has passages which open on said flat parallel surfaces and which establish mutual fluid communication between the bore of each sleeve on one side of said slide member with a bore of a sleeve on another side of said slide member so that it is pressure balanced within said chamber.

10. A valve as claimed in claim 9 wherein the sleeves on said one side of said slide member are aligned with the sleeves on said another side of said slide member.

11. In a valve construction, the combination comprising:
(a) structure forming a valve body, (b) said valve body having:
(i) walls defining a slide chamber,
(ii) a plurality of holes opening into said chamber through opposite wall portions thereof,
(iii) inlet and outlet ports in open communication with some of said holes,
(c) valve seals mounted in said holes,
(d) each of said seals having an end portion which projects into said chamber to present a slide-engaging seal face, an opposite end portion which is reciprocal in one of said holes, and a bore extending between said end portions,
(e) a valve slide reciprocally disposed in said chamber,
(f) said slide having opposite parallel flat surfaces slidably engaged by said seal faces to guide said slide for reciprocal movement,
(g) said slide being free to float in said chamber with said opposite surfaces moving toward and away from said opposite wall portions of said chamber and being held between said seals so that said opposite surfaces are normally out of contact with said wall portions,
(h) and said slide having internally connected ports on said opposite surfaces which communicate the bores of each sleeve on each side of said slide with the bore of a sleeve on the opposite side of said slide in at least two different positions thereof.

12. The valve construction as claimed in claim 11 wherein said seals are arranged in pairs with the seals of each pair being disposed on opposite sides of said slide, and wherein said opposite end portions of the seals of each pair are in fluid communication through said internally connected slide ports so that said slide is pressure balanced within said chamber.

13. The valve construction as claimed in claim 12 wherein said opposite end portions of said seals are recessed and are adapted to abut portions of said valve body, and wherein springs are provided between said recessed end portions and said valve body portions.

14. In a valve construction, the combination comprising:
(a) structure defining a valve body,
(b) said valve body having:
(i) walls defining a slide chamber,
(ii) first, second and third ports,
(iii) a plurality of holes opening into said chamber through opposite wall portions thereof,
(c) first, second and third pairs of tubular seal sleeves having end portions reciprocal in said holes and inner end portions which project into said chamber to present slide-engaging seal faces,
(d) said sleeves of each pair being disposed in axial alignment,
(e) the holes mounting a sleeve of each pair being in open communication with a different one of said valve body ports and the holes mounting the other sleeves of each pair being blind,
(f) a slide reciprocal in said chamber between a first position communicating said first and second ports and a second position communicating said first and third ports,
(g) said slide having opposite flat parallel surfaces slidably engaged by said seal faces to guide said slide for reciprocal movement, said slide being free to float in said chamber with said opposite surfaces moving toward and away from said opposite wall portions of said chamber and being held between said seal faces so that said opposite surfaces are normally out of sliding contact with said wall portions, and
(h) said slide having:
(i) a first pair of longitudinally spaced, internally connected ports which are formed transversely through said slide and open on said opposite surfaces thereof, (ii) a second pair of longitudinally spaced, internally connected ports which are formed transversely through said slide and open on said opposite surface thereof, (iii) said first pair of slide ports establishing fluid communication between the bores of said first and second pairs of sleeves in said first slide position, (iv) and said second pair of slide ports establishing fluid communication between said first and third pairs of sleeves in said second slide position.

15. A valve construction as claimed in claim 14 wherein said slide has a third position in which said pairs of slide ports are spaced from said pairs of sleeves, and wherein said slide has longitudinally spaced transverse passages which open on said opposite slide surfaces and communicate the bores of each pair of sleeves in said third slide position.

16. A valve construction as claimed in claim 14 wherein all of said sleeves engaging a common surface of said slide are of equal length and can move in unison to maintain sealing engagement with said slide while preventing longitudinal cocking of said slide in said chamber.

17. A valve comprising in combination:
(a) structure forming a valve body,
(b) said valve body having:
 (i) a slide chamber,
 (ii) a cylinder area at each end of said slide chamber,
 (iii) first and second passages respectively connected to said cylinder areas,
 (iv) a pilot valve pressure passage,
 (v) a plurality of fluid ports,
(c) a slide reciprocal in said chamber,
(d) said slide having opposite parallel flat surfaces normally spaced from the walls of said chamber,
(e) said slide being free to float in said chambers with said opposite surfaces moving toward and away from the walls of said chamber,
(f) a plurality of seal sleeves having heads reciprocally mounted in said valve body, inner ends projecting into said chamber in sliding engagement with said slide surface to guide said slide for reciprocal movement between first and second positions, and bores extending between said heads and said inner ends, (g) each of said valve body ports being in open communication with a different one of said sleeves, (h) said slide having internally connected ports formed transversely therethrough, said slide ports opening on said opposite slide surfaces and establishing fluid communication between said bores of the sleeves on opposite sides of said slide in said first and second positions, (i) pistons mounted in said cylinders for causing reciprocation of said slide between said first and second positions, (ii) a pair of fluid outlet passages respectively and (k) said pilot valve housing having
 (i) a fluid inlet passage communicating with said pilot valve pressure passage,
 (ii) a pair of fluid outlet passages respectively connected to said first and second valve body passages,
 (iii) an operating member movable in said housing for selectively communicating said inlet passage with one of said outlet passages,
 (iv) and solenoids for moving said operating member.

References Cited
UNITED STATES PATENTS

| | | | |
|---|---|---|---|
| 2,601,990 | 7/1952 | Holzer | 137—625.64 |
| 2,669,417 | 2/1954 | Ray | 137—625.38 |
| 2,725,077 | 11/1955 | Nicholl | 137—625.64 |
| 2,732,860 | 1/1956 | Ray | 251—282 X |
| 2,858,851 | 11/1958 | Holl | 251—282 X |
| 3,108,512 | 10/1963 | Lucien | 137—625.68 X |

M. CARY NELSON, *Primary Examiner.*

HENRY T. KLINKSIEK, *Examiner.*